United States Patent
Friedrich

(10) Patent No.: US 8,183,983 B2
(45) Date of Patent: May 22, 2012

(54) METHOD FOR THE AT LEAST TEMPORARY ACTIVATION OF BIDIRECTIONAL COMMUNICATION AND TRANSPONDER

(75) Inventor: Ulrich Friedrich, Ellhofen (DE)

(73) Assignee: Atmel Corporation, San Jose, CA (US)

( * ) Notice: Subject to any disclaimer, the term of this patent is extended or adjusted under 35 U.S.C. 154(b) by 1110 days.

(21) Appl. No.: 12/027,995

(22) Filed: Feb. 7, 2008

(65) Prior Publication Data

US 2008/0186144 A1   Aug. 7, 2008

Related U.S. Application Data

(60) Provisional application No. 60/900,726, filed on Feb. 12, 2007.

(30) Foreign Application Priority Data

Feb. 7, 2007   (DE) .......................... 10 2007 007 309

(51) Int. Cl.
*H04Q 5/22* (2006.01)
(52) U.S. Cl. ...................................... 340/10.3; 340/10.5
(58) Field of Classification Search ................. 340/10.1, 340/10.2, 10.3, 10.52, 10.5
See application file for complete search history.

(56) References Cited

U.S. PATENT DOCUMENTS

| | | | | |
|---|---|---|---|---|
| 4,955,038 A * | 9/1990 | Lee et al. | ...................... | 375/256 |
| 5,557,280 A * | 9/1996 | Marsh et al. | ..................... | 342/44 |
| 5,583,850 A * | 12/1996 | Snodgrass et al. | ............. | 370/342 |
| 5,684,828 A * | 11/1997 | Bolan et al. | .................. | 340/10.2 |
| 5,874,902 A * | 2/1999 | Heinrich et al. | ........... | 340/10.51 |
| 5,897,598 A * | 4/1999 | Puetz | ............................ | 340/5.27 |
| 5,929,801 A * | 7/1999 | Aslanidis et al. | ............... | 342/44 |
| 6,104,279 A * | 8/2000 | Maletsky | ................... | 340/10.41 |
| 6,104,281 A * | 8/2000 | Heinrich et al. | ............. | 340/10.5 |
| 6,690,264 B2 * | 2/2004 | Dalglish | ...................... | 340/10.4 |
| 6,933,848 B1 * | 8/2005 | Stewart et al. | ............. | 340/572.3 |
| 6,952,157 B1 * | 10/2005 | Stewart et al. | ............... | 340/10.2 |
| 7,030,731 B2 * | 4/2006 | Lastinger et al. | ............ | 340/10.1 |

(Continued)

FOREIGN PATENT DOCUMENTS

DE    197 56 395 B4    5/2008

(Continued)

OTHER PUBLICATIONS

Office Action for German Patent Application 10 2007 004309.9-27, Jan. 12, 2010.

(Continued)

*Primary Examiner* — Daniel Wu
*Assistant Examiner* — Rufus Point
(74) *Attorney, Agent, or Firm* — Baker Botts L.L.P.

(57) ABSTRACT

A method for the at least temporary activation of bidirectional communication between a transponder having a nonvolatile memory area and a base station, whereby the transponder in an at least partial mute state receives messages, but no information-related data from the nonvolatile memory area are transmitted and for activation a data stream is transmitted to the transponder by the base station, wherein the data stream for a transmission is linked with a symmetric password, the enable signal is extracted by the transponder with the symmetric password from the received data stream, and the transponder is activated at least temporarily after the enable signal has been verified as valid. The invention relates further to a transponder having means for carrying out this type of procedure.

20 Claims, 2 Drawing Sheets

U.S. PATENT DOCUMENTS

| | | | | |
|---|---|---|---|---|
| 7,068,173 | B2* | 6/2006 | Shanks et al. | 340/572.4 |
| 7,161,469 | B2* | 1/2007 | Turner et al. | 340/10.2 |
| 7,373,525 | B2* | 5/2008 | Murakoshi | 713/194 |
| 7,538,678 | B2* | 5/2009 | Jung et al. | 340/572.1 |
| 7,737,824 | B2* | 6/2010 | Aikawa et al. | 340/10.4 |
| 7,742,348 | B2* | 6/2010 | Schuessler | 365/192 |
| 7,822,944 | B2* | 10/2010 | Schuessler | 711/217 |
| 7,872,567 | B2* | 1/2011 | Friedrich | 340/10.52 |
| 7,872,582 | B1* | 1/2011 | Diorio | 340/572.1 |
| 7,884,702 | B2* | 2/2011 | Drago et al. | 340/10.5 |
| 7,920,050 | B2* | 4/2011 | Juels et al. | 340/10.4 |
| 8,044,774 | B1* | 10/2011 | Diorio | 340/10.41 |
| 8,066,181 | B2* | 11/2011 | Bishop et al. | 235/380 |
| 2002/0183882 | A1 | 12/2002 | Dearing et al. | |
| 2004/0066278 | A1* | 4/2004 | Hughes et al. | 340/10.1 |
| 2005/0099298 | A1* | 5/2005 | Mercer et al. | 340/572.1 |
| 2005/0140501 | A1* | 6/2005 | Rizzo et al. | 340/10.51 |
| 2005/0231328 | A1 | 10/2005 | Castle et al. | |
| 2005/0267886 | A1* | 12/2005 | Pepper et al. | 707/8 |
| 2005/0270142 | A1* | 12/2005 | Moreaux et al. | 340/10.51 |
| 2006/0087407 | A1* | 4/2006 | Stewart et al. | 340/10.52 |
| 2006/0187031 | A1* | 8/2006 | Moretti et al. | 340/539.22 |
| 2007/0046432 | A1* | 3/2007 | Aiouaz et al. | 340/10.1 |
| 2007/0276985 | A1* | 11/2007 | Schuessler | 711/100 |
| 2008/0022371 | A1* | 1/2008 | Chen et al. | 726/4 |
| 2008/0129463 | A1* | 6/2008 | Tuttle | 340/10.5 |

FOREIGN PATENT DOCUMENTS

| | | |
|---|---|---|
| EP | 1587 001 A1 | 10/2005 |
| EP | 1742 166 A1 | 1/2007 |
| WO | WO 2005/101333 A1 | 10/2005 |
| WO | 2006/104354 | 10/2006 |
| WO | WO 2006/104354 A1 | 10/2006 |

OTHER PUBLICATIONS

Office Action for Chinese Patent Application 200880000522.4, Dec. 6, 2010.

Berthold et al. "RFID Verbraucherängste und Verbraucherschutz" Wirtschaftsinformatik, No. 47, issue, Jun. 2005, pp. 1-9.

Finkenzeller, Klaus, RFID-Handbuch [RFID Handbook], 4$^{th}$ edition (2006), Carl Hanser Verlag, Munich, 2006, pp. 235-237, 252-258.

* cited by examiner

METHOD FOR THE AT LEAST TEMPORARY ACTIVATION OF BIDIRECTIONAL COMMUNICATION AND TRANSPONDER

This nonprovisional application claims priority to German Patent Application No. DE 10 2007 007 309, which was filed in Germany on Feb. 7, 2007, and to U.S. Provisional Application No. 60/900,726, which was filed on. Feb. 12, 2007, and which are both herein incorporated by reference.

BACKGROUND OF THE INVENTION

1. Field of the Invention

The present invention relates to a method for the at least temporary activation of bidirectional communication between a transponder and a base station. The invention relates further to a transponder that can be shifted at least to a first mute state and to a temporarily activated state.

2. Description of the Background Art

Bidirectional communication between a base station or a reader and a passive or semipassive transponder is used, for example, in contactless identification systems or so-called radio frequency identification (RFID) systems. This type of system typically consists of a base station or a write and/or read device or a reader unit and a plurality of transponders or remote sensors (tags), which are located simultaneously within the response range of the base station. The transmission of power and data between the base station and the transponder occurs either through inductive coupling or through coupling with the use of electromagnetic waves. The transponders or their transmitting and receiving devices usually do not have an active transmitter for data transmission to the base station. Transponders without active transmitters are called passive transponders when they do not have their own power supply and semipassive transponders when they have their own power supply. Passive transponders draw the power necessary for their supply from the electromagnetic field emitted by the base station or the emitted power.

Backscatter coupling is employed, as a rule, for data transmission from a transponder to a base station with ultrahigh frequency (UHF) or microwaves in the far field of the base station. To that end, the base station emits electromagnetic carrier waves, which are modulated and reflected by the transmitting and receiving device of the transponder by means of a modulation method in accordance with the data to be transmitted to the base station. Typical modulation methods are amplitude modulation, phase modulation, and amplitude shift keying (ASK) subcarrier modulation, in which the frequency or the phase position of the subcarrier is modified.

An access control method for transponders is described in the draft standard ISO/IEC_CD 18000-6C of 7 Jan. 2005. The transponder in this case is first selected from a number of transponders in a selection or arbitration process. The described selection process is a stochastic process in the form of a slot-based ALOHA protocol. Selection methods of this kind are described in detail, for example, in the handbook by Klaus Finkenzeller, RFID-Handbuch [RFID Handbook], $3^{rd}$ ed., HANSER, 2002.

When the transponder is chosen or selected or singled out, the reader unit transmits a query to the transponder in the form of a retransmission of a random number previously transmitted by the transponder within the scope of the arbitration process, whereupon the transponder transmits protocol control bits (PC) and an identification in the form of a so-called electronic product code (EPC) to the reader unit. The protocol control bits contain information on a physical layer of the transmission path. The identification or the electronic product code EPC represents inter alia a product tagged with the transponder. The assignment of EPC to the tagged product is standardized, so that the product can be inferred from the EPC information. Furthermore, the EPC can be used by the reader unit as a pointer to other information, for example, to a password assigned to the EPC. The password can then be used to block memory areas in the transponder for write accesses.

The transmission of the EPC upon a query to the reader unit entails certain risks, however. Thus, during transport of products unauthorized persons can search selectively for products of a certain type, for example, for high-quality watches or weapons, because the product-identifying EPC is transmitted unprotected. To accomplish this, it is only necessary to bring a suitable reader into the transmission range of the transponders, for example, to a highway parking area or into train stations.

After the transmission of the PC and EPC by the transponder, read and/or write access to memory areas within the transponder by the reader unit is possible, unless the specific areas are blocked or locked for write access. Furthermore, read access to passwords can also be barred. Despite a possible read locking of passwords, there is some security risk that unauthorized persons have access to perhaps private memory contents.

When a transponder is used in so-called chip cards, personal data may be stored as memory contents. It is also desirable here to regulate access to these data, for example, so that upon entry into a store it cannot be determined automatically by reading the memory contents whether the particular customer still has funds on the chip card.

In the daily routine in industry as well, it may be desirable to mute a transponder at least temporarily. If, for example, transponders are attached to all products of a shipping unit, such as a pallet, it may be advantageous in logistics for identification and for management of the shipping unit when the transponders are muted at least partially. As a result, for example, recording becomes more rapid and efficient and multiple recording of certain information can be avoided. This in turn leads to a reduction of the computational effort in a so-called middleware for filtering functions or the like.

Muting of a transponder occurs, for example, by means of a so-called cloak or camouflage command. U.S. Pat. No. 6,690,264 B2 discloses a transponder, whereby the transponder comprises a circuit by which a switch can be actuated, so that communication via an antenna, i.e., transmission of data by the transponder, is enabled or prevented. Reception of data, on the contrary, is also possible in the mute state. This makes it possible to transmit a command to the transponder by which it is activated. An enable signal in this case is transmitted in plain text. This contradicts the general rule that passwords or the like at least in the forward channel may not be transmitted in plain text (i.e., from a base station to a transponder, or forward link), because the forward channel can be intercepted at a distance of 1 to 2 kilometers.

SUMMARY OF THE INVENTION

It is therefore an object of the present invention to provide a secure method for the at least temporary activation of bidirectional communication between a transponder and a base station, as well as a transponder that can be muted and at least temporarily activated.

This object is attained by a method for the at least temporary activation of bidirectional communication between a transponder having a nonvolatile memory area and a base station, whereby the transponder in an at least partial mute state receives messages but at least no information-related data from the nonvolatile memory area are transmitted. According to the invention, for activation, a data stream is transmitted to the transponder by the base station, whereby the data stream before a transmission is linked, particularly encoded, with a symmetric password, an enable signal is extracted by the transponder with the symmetric password from the received data stream, and the transponder is at least temporarily activated after the enable signal has been verified as valid. In an embodiment of the invention, it is possible for the transponder to transmit random numbers in a partial mute state. The transponder, however, at least transmits no data from its nonvolatile memory.

Transmission of the enable signal in plain text in the forward channel is avoided by encryption of the data stream with a symmetric password stored in the transponder. Thus, it is in fact basically possible for an eavesdropper to intercept the transmitted data stream, but he receives no information on the enable signal and/or the password.

A multipart data stream is transmitted in an embodiment of the invention. In an embodiment, in this case, initially a first symmetric password is linked, particularly encoded, by the base station with any random number and transmitted to the transponder. As the second part of the data stream, the enable signal is also linked, particularly encoded, with the random number and transmitted to the transponder. The transponder extracts the random number using the symmetric first password and can decode the second part of the data stream using the extracted random number and thereby verify the received enable signal.

In an embodiment of the invention, a two-part symmetric password is stored in the transponder. In an embodiment, part of the password is used as an enable signal in this case. In this regard, two separate passwords are also called a two-part password within the meaning of the invention. The two parts of the password in another embodiment are linked to one another for a transmission, for example, via an XOR operation. Alternatively or in addition, an identification code, particularly a transponder-specific identification code or parts thereof, can function as a password (part). Consecutive numbers are typically used as transponder-specific identification codes, so that at least parts of a corresponding identification code are known to an authorized base station. Preferably, however, no passwords that are also used to enable write access to the transponder are used for the activation. This can increase security.

In another embodiment of the invention, the data stream comprises an address pointer in an activation memory area in the transponder. In regard to the invention, a memory area of the transponder in which an enable signal, a password, or the like for the extraction of the enable signal is stored is called an activation memory area. An activation memory area in this case can be provided in any memory bank of the transponder. Typically, however, for conformity with the aforementioned standard ISO/IEC_CD 18000-6C, storage should not occur in a protected password memory area. In an embodiment, the address pointer points to a memory area whose content is used as a symmetric password for encoding the enable signal.

In another embodiment of the invention, the data stream comprises a mask data stream, whereby the enable signal is extracted from the mask data stream by the symmetric password. In an advantageous embodiment of the invention, the data stream comprises a first part, particularly a first encoded part from which an address pointer is extracted. The second part is a mask data stream, whereby the second part may be decoded by means of the content or the password stored in the transponder memory area corresponding to the address pointer. If the decoded mask data stream is the same as the enable signal, an (at least temporary) activation of the transponder takes place. Thus, any content of an activation memory area known to the base station can be used as an enable signal. The employed enable signal is made known to the transponder by transmission of an address point to the associated memory area. The address pointer and the enable signal, in this case, can each be transmitted encoded, whereby the symmetric password is used for encoding. In another embodiment, the content of the memory area associated with the address pointer is used as the password. The enable signal can be extracted from the mask data stream and verified by means of this password. In this case, the address pointer can be encoded for transmission. The enable signal, for example, can be used for encoding, whereby the address pointer is extracted from the encoded address pointer in the transponder with the assumption of a correct enable signal.

In another embodiment of the invention, a part of the data stream, particularly the mask data stream, is transmitted in an interleaving process by the base station. In an interleaving process, bits of the data stream and placeholder bits, so-called dummy bits, are transmitted alternately. In an embodiment of the invention, while the data stream is being received by the transponder, alternately first a so-called mask bit, for example, a bit of the enable signal, is read from the activation memory area according to the transmitted address and stored in a buffer, and then a corresponding bit of the password stored in the transponder is linked with an associated bit, received in the mask data stream, and the result is compared with the mask bit stored in the buffer. If the compared bits match, then a next bit pair is subjected to the comparison. By means of the interleaving process, it is possible to change only the column address of the nonvolatile memory in the transponder (between the address of the mask, i.e., the enable signal, and the address of the password); in this case, the bit address is the same for both. This reduces the circuitry requirements for reading the bits.

In another embodiment of the invention, the data stream is transmitted using a standardized command. An eavesdropper usually has no knowledge of the existence of a muted transponder in his environment. By sending an enable code by means of a standardized command, which is customarily used for communication, the eavesdropper is not made aware that transmission of an enable signal is occurring.

In another embodiment of the invention, an enable signal is transmitted with use of the select command in accordance with ISO/IEC 18000-6C. The select command permits transmission of any number of bits in a so-called mask data stream. Further, an address of an associated (selection) mask is transmitted to the transponder by the select command. The address of the associated (selection) mask can be present in the user—transponder (TID) or EPC—memory area of the transponder, so that different configuration options are possible here. If the address information is to be longer than 16 bits, an internal address pointer can rotate through the first 16 bits of the address.

In another embodiment of the invention, the command comprises a counter which directly or indirectly indicates a number of bits transmitted in the interleaving process. This type of counter in the select command is standard. To prevent an interleaving process and thereby an enable command from being recognized, the counter can be doubled accordingly.

In another embodiment of the invention, during muting the transponder is placed in one of at least two possible mute states. In an embodiment, a distinction is made here between temporary and permanent muting. In another embodiment, different stages of muting can be differentiated, for example, complete, irreversible muting and partial muting in which the sending of random numbers is still permissible.

In an embodiment of the invention, at least one control bit is set or deleted in the transponder to establish a desired mute state. The control bit in this case can be stored as a label or flag in the transponder. In another embodiment, a control bit is reproduced or emulated. In so doing, it is conceivable, for example, that if an enable signal with at least one set bit is present, a set control bit is reproduced, and the transponder is muted. For activation, the enable signal is deleted and for muting a new or the already used enable signal is again written in the transponder.

In a development of the invention, the state is established by setting or deletion of two control bits, whereby a first bit pattern formed from the control bits activates a transponder, a second bit pattern formed from the control bits temporarily mutes the transponder, a third bit pattern formed from the control bits partially mutes the transponder, whereby a random number can be generated by the transponder and transmitted in this state, and a fourth bit pattern formed from the control bits permanently mutes the transponder. A permanent muting of the transponder thereby corresponds to a "killing" of the transponder. The temporary muting is thereby also comparable to a partial kill function. A temporary or permanent muting of the transponder is thereby possible, for example, by the standardized kill command. Depending on the bit pattern, it is possible thereby that when a permanently muted transponder is damaged, so that a control bit loses its status, at least one "subordinate" muting remains available.

In another embodiment of the invention, the transponder is temporarily activated by transmission of the enable signal, whereby a second enable signal is transmitted for permanent activation. An additional security level is provided in this way.

In another embodiment of the invention, the symmetric password, the enable signal, the mask, and/or the address of the activation memory area is/are transmitted to the base station by a higher-order, second transponder. This makes possible a simple key management.

In another embodiment of the invention, the symmetric password and/or the enable signal is/are overwritten at least in part in the transponder after a temporary activation. It is conceivable that the encoded enable signal transmitted in the forward channel is intercepted and without knowledge of the encoding method the encoded signal is used for activation at a later time. If the symmetric password, the enable signal, or parts thereof are modified after the activation, however, it is not possible for the eavesdropper to activate the transponder with the intercepted signal.

In another embodiment of the invention, the transponder signals an at least partial muted state in an arbitration process. As a result, a reader can in fact detect the presence of a transponder in its field, but it receives no other information about the transponder and/or the associated product. If there are several transponders for the labeling of products in a packaging unit, for example, a pallet, it is possible thereby to detect the transponder or transponders and, for example, to perform a simple counting function. This type of signaling of a mute state is conceivable, for example, in a first mute state, whereby in a second mute state the transponder does not reveal itself and does not respond to a query within the scope of an arbitration process or the like.

In an aspect of the invention, a signaling occurs by the transmission of a random number different from the standard during the arbitration. Customarily, within the scope of an arbitration process because of a query, the so-called query request, a transponder sends a 16-bit random number. If the transponder, in contrast, responds with a random number different therefrom, for example, an 8-bit random number or a 20-bit random number, the base station can conclude therefrom that there is a transponder within its field but it does not send additional information-related data from the nonvolatile memory area. In another embodiment of the invention, the transponder can respond with an established number, for example, a 16-digit zero stream and thus signal its mute state. Alternatively or in addition, in other embodiments, a mute state is signaled at a later time during the arbitration process; for example, instead of a conventional response with the identification to an acknowledgement (acknowledge command), the response is a random number or a mute signal.

The object is attained further by a transponder comprising means for carrying out the described method. The transponder can be easily used here in a system with transponders, which know no temporary muting.

The object is attained further by a transponder with a switch comprising a nonvolatile memory area for at least temporary activation of bidirectional communication between the transponder and a base station, whereby the transponder has means by which in an at least partial mute state messages can be received, but the transmission of information-related data from the nonvolatile memory area in the mute state is prevented, at least one symmetric password and an enable signal are stored in the nonvolatile memory area, the transponder has means by which the enable signal can be extracted from a received data stream with the symmetric password and is verifiable, and bidirectional communication of the transponder can be activated at least temporarily by the switching means with a valid enable signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
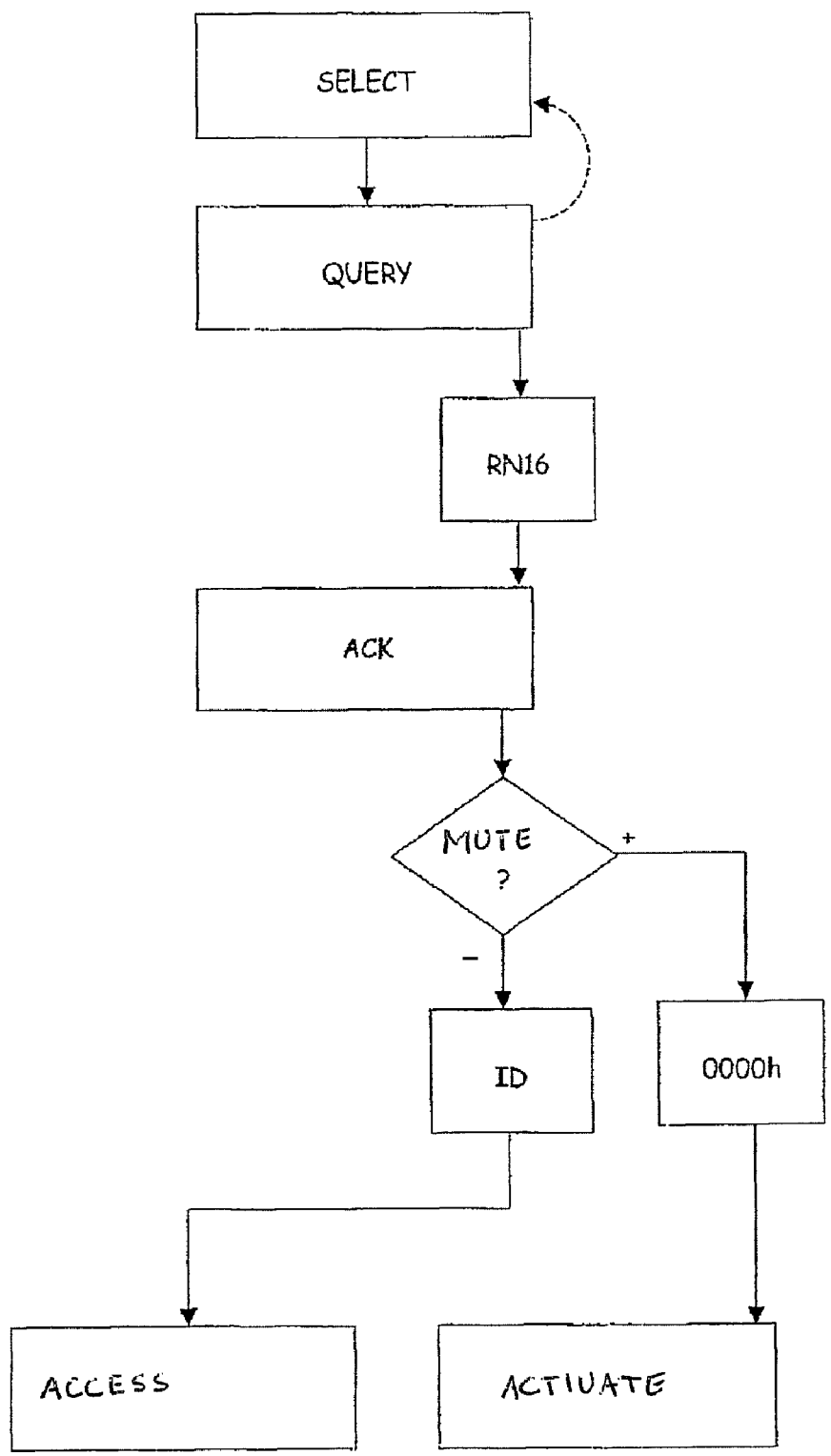
FIG. 1 shows a schematic course of an access control process for a transponder.

FIG. 1 shows schematically a course of an access control process for any transponder. The transponder in this case is first selected in a selection or arbitration process from a number of transponders. According to the draft standard ISO/IEC_CD 18000-6C, for this purpose first a so-called select command is sent to the transponder (SELECT). The transponder does not respond to the base station to this select command. Next the base station sends a query, the so-called query command (QUERY). In this case, it can also be a repeated query, the so-called QueryRep. The transponder responds with a 16-bit random number (RN16) to the query or the QueryRep command. In the shown exemplary embodiment, the transponder responds to the query command with a 16-bit random number independent of a possible muting of the transponder. The base station responds to the random number RN16 with an acknowledge command (ACK). The acknowledge command ACK comprises the random number received by the base station. If the transponder is not muted, the transponder responds, as is conventional in the aforementioned standard, with its identification ID, for example, the EPC or a transponder-specific identification. After the transmission of the identification ID by the transponder to the base station, the conventional access control then follows by means of known commands, for example, the access command. If, on the other hand, the transponder is muted, the transponder in the shown exemplary embodiment responds to the acknowledgement command ACK with a zero sequence (0000h). It is thereby discernible for the base station that the transponder is muted. In the mute state, the base station receives at least no further information about data from a nonvolatile memory area of the transponder. If the base station is interested in additional information in regard to the data of the transponder and it has appropriate authorization, the base station can activate the transponder at least temporarily for reading out this information.

In many applications, the activation of the transponder by a base station at all points in time is not necessary and/or desirable. Thus, for example, it is conceivable that many of the same or at least similar products are combined in a packaging unit, for example, stored on a pallet. If the packaging unit is transported as a whole or relayed in another manner in a product line, it is not necessary to read out all information from each transponder at each point in time. Rather, it may be sufficient to check the presence of a transponder to determine in this way, for example, the number of products arranged on the pallet rapidly without costly filtering mechanisms.

It is desirable in other applications that a transponder is completely mute in a certain environment; i.e., the transponder does not respond to a query command. The base station thereupon, for example, begins a new select command, as indicated in FIG. 1 by the dashed, curved arrow.

It is provided in an embodiment of the invention that a transponder differentiates between at least two different mute states, whereby in a first mute state the transponder can send a random number, as shown on the right in the flowchart in FIG. 1, and in a second mute state the transponder sends no data at all, as indicated in the flowchart by the dashed arrow. In another mute state, it can be provided that the transponder is permanently mute. The transponder is thereby killed.

Activation of a temporarily muted transponder occurs according to the invention by means of an enable signal, whereby the enable signal is transmitted encoded from the base station to the transponder. For this purpose, it is conceivable, for example, to link the enable signal with a symmetric password. Because the transponder knows the enable signal and the password, the transponder with knowledge of the one part can extract the second part from the received data stream and thereby also verify it.

In an exemplary embodiment of the invention, a multipart data stream is sent from the base station to the transponder for (temporary) activation. The data stream in an exemplary embodiment comprises an address pointer and the enable signal, whereby preferably both the address pointer and the enable signal are encoded. Transmission of this type of multipart data stream is possible, for example, by means of the select command in accordance with ISO/IEC_CD 18000-6C.

Figures 2, 3:
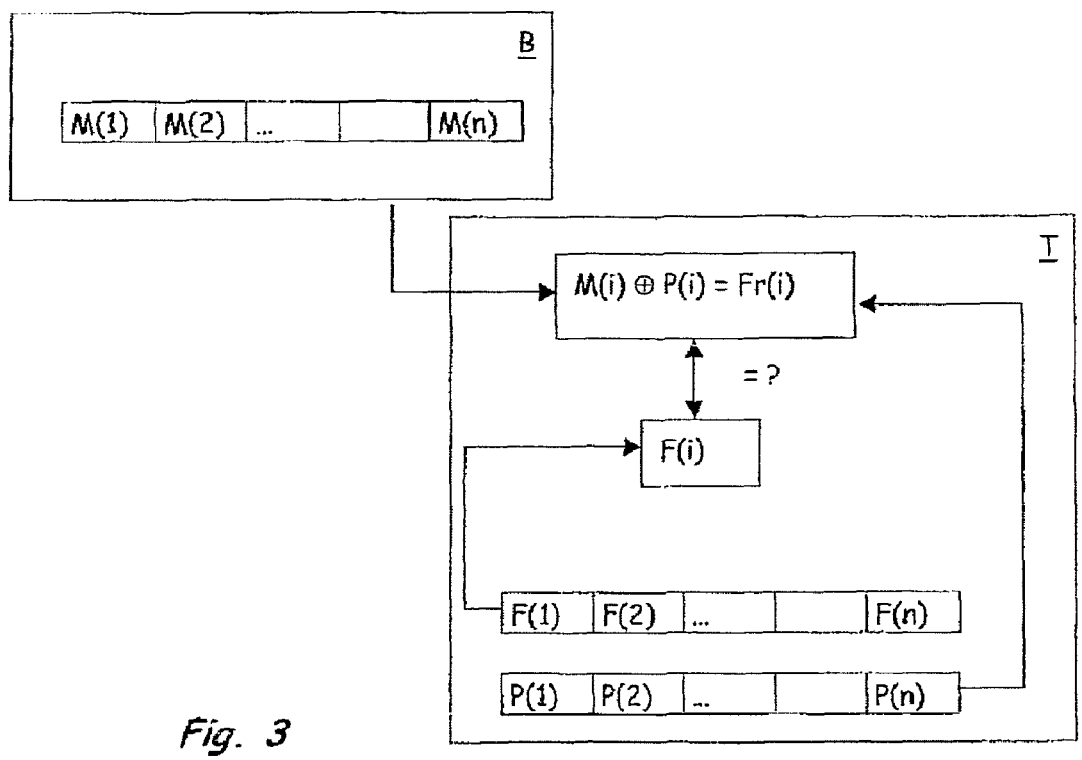
FIG. 2 shows schematically a command transmitted by a base station to the transponder
for the at least temporary activation of the transponder.
FIG. 3 shows a schematic depiction of a comparison in an interleaving process.

FIG. 2 shows schematically a structure of an appropriate select command. The select command comprises first the command sequence SELECT. The usual bits according to the aforementioned standard follow the command sequence SELECT, whereby, for example, a defined memory bank or the like in which the password and/or the enable signal is/are stored can be selected. The select command provides further for the transmission of an address pointer. According to the invention, to activate a muted transponder an address pointer, in the shown exemplary embodiment an encoded address pointer A', is transmitted to an activation data area in the nonvolatile memory of the transponder. The address pointer A' is encoded, for example, with a symmetric password P.

The encoded address pointer A' is followed by a counter N, which reports the number of subsequently transmitted bits. Because any eavesdropper can also count this number, it is not necessary to encode this number. In the following part of the command, a masked data stream or mask data stream M is transmitted, whereby an enable signal F is encoded with the symmetric password P. In the transponder, the enable signal F to activate the transponder is stored in the memory area corresponding to the encoded address pointer A'. The enable signal F can be changed in this case by changing the content of the memory area.

In another embodiment, a content of a memory area corresponding to the address pointer is used as the symmetric password P for encoding the enable signal F. The password P can therefore be selected as desired. Here, the address pointer can be encoded to the memory area. Encoding occurs, for example, with use of the enable signal F, whereby with the assumption of a correct transmission of the enable signal F, the transponder extracts the address pointer from the received signal and reads out the associated content as password P for extracting the enable signal F from the mask data stream M.

According to the invention, in an embodiment, the mask data stream M is transmitted in a so-called interleaving process from the base station to the transponder. The command according to the standard provides further a check digit CRC.

FIG. 3 shows schematically a reception and verification of the mask data stream M in the interleaving process in transponder T. In this case, in a first step an appropriate bit of the enable signal or mask bit F1 is read from the addressed memory area of the transponder T and stored in a buffer. During the second received bit, a first bit is read out of the symmetric password P stored in the transponder T, whereby the same bit address pointer or the corresponding word pointer as for reading the mask bit F1 is used for this. The read password bit P(1) is linked with the corresponding bit of the mask data stream M, received by the base station B, to a received enable signal bit Fr(i), for example, via an XOR operation. The result Fr(i) of the linking is compared with the corresponding datum F(i) stored in the buffer. If the data agree, the bit address can be forwarded and another value pair can be supplied by base station B for a comparison.

The advantage of this method is that in the transponder T only a column address for addressing the mask, i.e., the enable signal F, and/or the password P needs to be changed, because a matching bit address is used. As a result, the circuitry requirements are considerably reduced. This is due to the fact, for example, that nonvolatile memories of conventional transponders are generally designed so that in each case only one bit from a fixed line can be read. This bit address is used in order to switch through, using a data multiplexer or the like, a corresponding column of the memory to a sense amplifier. A column decoder is needed for this. Additional sense amplifiers and/or activity of the reading mechanism can be eliminated, however. Activity in this regard means the charging and/or discharging of capacitive loads, which results in direct current losses. The more economical activity thereby has a considerable effect on the transmission range of a passive RFID communication system. To read several bits simultaneously from the transponder memory, therefore, receiving and comparing the data in the interleaving mode are especially advantageous.

It is possible by means of the transponder of the invention and/or the method of the invention using a standardized command to transmit an enable signal encoded to the transponder without great circuitry requirements and to decode it likewise without great circuitry requirements in the transponder.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method, comprising:
receiving at a transponder, from a base station in response to the transponder communicating to the base station a signal indicating that the transponder is in at least a partial mute state, a message comprising a masked data stream encoded using a symmetric password stored at the transponder, the masked data stream comprising an enable signal for activating the transponder;
accessing, in response to receiving the message, the symmetric password stored at the transponder;
extracting the enable signal from the masked data stream using the symmetric password; and
transitioning from the at least a partial mute state to an active state if the enable signal extracted from the masked data stream corresponds to a valid enable signal.

2. The method of claim 1, wherein the message further comprises an address pointer, the address pointer corresponding to a memory area of a nonvolatile memory of the transponder.

3. The method of claim 2, wherein the symmetric password further comprises content of the memory area of the nonvolatile memory of the transponder corresponding to the address pointer.

4. The method of claim 1, wherein the message is constructed using a select command of ISO/IEC-CD 18000-6C standard.

5. The method of claim 1, wherein the message further comprises a bit counter.

6. The method of claim 1, wherein the message further comprises one or more CRC bits.

7. The method of claim 1, wherein the at least a partial mute state comprises a state in which the transponder, in response to a query message from the base station, transmits at least a random number to the base station.

8. The method of claim 1, wherein the at least a partial mute state comprises a state in which the transponder, in response to a query message from the base station, does not transmit data to the base station temporarily.

9. The method of claim 1, wherein the at least a partial mute state is one of a plurality of possible mute states for the transponder, a current mute state of the transponder being set using one or more control bits.

10. The method of claim 1, further comprising updating one or more of the symmetric password and the enable signal.

11. The method of claim 1, wherein at least part of the masked data stream is transmitted in an interleaving process by the base station.

12. A transponder, comprising:
a nonvolatile memory area;
a receiving unit configured to receive, from a base station in response to the transponder communicating to the base station a signal indicating that the transponder is in at least a partial mute state, a message comprising a masked data stream encoded using a symmetric password stored at the transponder, the masked data stream comprising an enable signal for activating the transponder; and
a control logic configured to:
access, in response to receiving the message, the symmetric password stored at the transponder;
extract the enable signal from the masked data stream using the symmetric password; and
transition from the at least a partial mute state to an active state if the enable signal extracted from the masked data stream corresponds to a valid enable signal.

13. The transponder of claim 12, wherein the message further comprises an address pointer, the address pointer corresponding to a memory area of a nonvolatile memory of the transponder.

14. The transponder of claim 13, wherein the symmetric password further comprises content of the memory area of the nonvolatile memory of the transponder corresponding to the address pointer.

15. The transponder of claim 12, wherein the message is constructed using a select command of ISO/IEC-CD 18000-6C standard.

16. The transponder of claim 12, wherein the at least a partial mute state comprises a state in which the transponder, in response to a query message from the base station, transmits at least a random number to the base station.

17. The transponder of claim 12, wherein the at least a partial mute state comprises a state in which the transponder, in response to a query message from the base station, does not transmit data to the base station temporarily.

18. The transponder of claim 12, wherein the at least a partial mute state is one of a plurality of possible mute states for the transponder, a current mute state of the transponder being set using one or more control bits.

19. The transponder of claim 12, wherein at least part of the masked data stream is transmitted in an interleaving process by the base station.

20. A base station, comprising:
a memory; and
one or more processors configured to:
receive from a transponder a signal indicating that the transponder is in at least a partial mute state;
determine to activate the transponder;
transmit, in response to determining to activate the transponder, a message comprising a masked data stream encoded using a symmetric password stored at the transponder, the masked data stream comprising an enable signal for activating the transponder;
the transponder being operable to:
receive the transmitted message;
access, in response to receiving the message, the symmetric password stored at the transponder;
extract the enable signal from the masked data stream using the symmetric password; and
transition from the at least a partial mute state to an active state if the enable signal extracted from the masked data stream corresponds to a valid enable signal.

* * * * *